United States Patent
He et al.

(10) Patent No.: US 9,961,213 B2
(45) Date of Patent: May 1, 2018

(54) ELECTRONIC DEVICE AND IMAGE CAPTURING APPARATUS

(71) Applicants: Beijing Lenovo Software Ltd., Beijing (CN); Lenovo (Beijing) Co., Ltd., Beijing (CN)

(72) Inventors: Zhiqiang He, Beijing (CN); Yingjia Yao, Beijing (CN); Junfeng Liu, Beijing (CN)

(73) Assignees: Beijing Lenovo Software Ltd., Beijing (CN); Lenovo (Beijing) Co., Ltd., Beijing (CN)

( * ) Notice: Subject to any disclaimer, the term of this patent is extended or adjusted under 35 U.S.C. 154(b) by 1016 days.

(21) Appl. No.: 14/230,430

(22) Filed: Mar. 31, 2014

(65) Prior Publication Data
US 2015/0215500 A1    Jul. 30, 2015

(30) Foreign Application Priority Data
Jan. 28, 2014    (CN) .......................... 2014 1 0041530

(51) Int. Cl.
*H04N 7/18*    (2006.01)
*H04N 1/00*    (2006.01)
(Continued)

(52) U.S. Cl.
CPC ....... *H04N 1/00116* (2013.01); *H04N 5/2252* (2013.01); *H04N 5/232* (2013.01); *H04N 5/23241* (2013.01)

(58) Field of Classification Search
CPC .. H04N 1/00116; H04N 5/2252; H04N 5/232; H04N 5/23241
(Continued)

(56) References Cited

U.S. PATENT DOCUMENTS 6,549,231 B1    4/2003    Matsui
7,329,057 B2    2/2008    Shimano et al.
(Continued)

FOREIGN PATENT DOCUMENTS

CN    1701595 A    11/2005
CN    201383846 Y    1/2010
(Continued)

OTHER PUBLICATIONS

Second Chinese Office Action regarding Application No. 201410041530.0 dated Feb. 16, 2017. English translation provided by Unitalen Attorneys at Law.
(Continued)

*Primary Examiner* — Gims S Philippe
(74) *Attorney, Agent, or Firm* — Harness, Dickey & Pierce, P.L.C.

(57) ABSTRACT

An electronic device and an image capturing apparatus are provided. The electronic device includes: a fixing apparatus, adapted to, in a case that a user wears the electronic device, maintain a position relationship between the electronic device and at least part of body of the user; an image capturing apparatus having an image capturing area, adapted to capture an image in the image capturing area; a data transmission apparatus, adapted to, in a case that a data connection is established between the electronic device and a second electronic device, perform data transmission with the second electronic device; an audio output apparatus having an audio output area, adapted to output sound to the audio output area; and a processing apparatus, adapted to control at least one of the image capturing apparatus, the data transmission apparatus and the audio output apparatus, wherein the electronic device comprises no image displaying apparatus.

20 Claims, 8 Drawing Sheets

(51) Int. Cl.
*H04N 5/225* (2006.01)
*H04N 5/232* (2006.01)

(58) Field of Classification Search
USPC .................. 348/158, 143, 47; 345/1.1, 8
See application file for complete search history.

(56) References Cited

U.S. PATENT DOCUMENTS

| | | | |
|---|---|---|---|
| 7,542,012 B2 * | 6/2009 | Kato .................. | G02B 27/0176 345/1.1 |
| 7,609,951 B2 | 10/2009 | Shimano et al. | |
| 7,859,568 B2 | 12/2010 | Shimano et al. | |
| 8,890,954 B2 * | 11/2014 | O'Donnell ............. | G08C 17/02 348/143 |
| 8,952,889 B2 | 2/2015 | Jacobsen et al. | |
| 2006/0165395 A1 | 7/2006 | Shimano et al. | |
| 2008/0136932 A1 | 6/2008 | Shimano et al. | |
| 2008/0137983 A1 | 6/2008 | Shimano et al. | |
| 2008/0266386 A1 * | 10/2008 | Maeda ................... | G06F 3/012 348/47 |
| 2011/0001695 A1 | 1/2011 | Suzuki et al. | |
| 2011/0273365 A1 * | 11/2011 | West ................. | G02B 27/0176 345/8 |
| 2012/0068921 A1 | 3/2012 | Jacobsen et al. | |

FOREIGN PATENT DOCUMENTS

| | | |
|---|---|---|
| CN | 201489263 U | 5/2010 |
| CN | 201682601 U | 12/2010 |
| CN | 201821392 U | 5/2011 |
| CN | 202121685 U | 1/2012 |
| CN | 202256866 U | 5/2012 |
| CN | 103181149 A | 6/2013 |
| CN | 203859810 U | 10/2014 |
| JP | H11164186 A | 6/1999 |
| JP | 2007258913 A | 10/2007 |

OTHER PUBLICATIONS

First Chinese Office Action regarding Application No. 201410041530.0 dated Jul. 8, 2016. English translation provided by http://globaldossier.uspto.gov.

Third Chinese Office Action regarding Application No. 201410041530.0 dated Aug. 10, 2017. English translation provided by Unitalen Attorneys at Law.

* cited by examiner (1)　　　　　　　　(2)　　　　　　　　(3)

ELECTRONIC DEVICE AND IMAGE CAPTURING APPARATUS

The present application claims the priority to Chinese Patent Application No. 201410041530.0, entitled "ELECTRONIC DEVICE AND IMAGE CAPTURING APPARATUS", filed on Jan. 28, 2014 with the Chinese State Intellectual Property Office, which is incorporated herein by reference in its entirety.

FIELD

The disclosure relates to the field of electronic technology, and in particular, to an electronic device and an image capturing apparatus.

BACKGROUND

Image capturing apparatus such cameras and digital videos are necessary for a user to capture image data in daily life.

Conventionally, the user needs to carry the image capturing apparatus for image capturing, but the image capturing apparatus usually has a large size and thus is inconvenient to be carried, and accordingly the image capturing is inconvenient. Thus, how to improve the portability of the image capturing apparatus is proposed.

SUMMARY

In view of above, an electronic device and an image capturing apparatus are provided in the disclosure, to improve the portability of an image capturing apparatus.

Technical solutions of the disclosure are as follows.

An electronic device is provided. The electronic device includes a fixing apparatus, an image capturing apparatus, a data transmission apparatus, an audio output apparatus and a processing apparatus.

The fixing apparatus is adapted to, in a case that a user wears the electronic device, maintain a position relationship between the electronic device and at least part of body of the user.

The image capturing apparatus having an image capturing area is adapted to capture an image in the image capturing area.

The data transmission apparatus is adapted to, in a case that a data connection is established between the electronic device and a second electronic device, perform data transmission with the second electronic device.

The audio output apparatus having an audio output area is adapted to output sound to the audio output area.

The processing apparatus is adapted to control at least one of the image capturing apparatus, the data transmission apparatus and the audio output apparatus.

The electronic device includes no image displaying apparatus.

Optionally, the image capturing apparatus includes an image capturing unit and a supporting unit connected to the image capturing unit, a position of the image capturing unit with respect to the electronic device includes at least a first position and a second position, based on different positions of the supporting unit with respect to the electronic device.

Optionally, the electronic device further includes a first detection apparatus adapted to detect the position of the image capturing unit, the processing apparatus is adapted to, if it is detected by the first detection apparatus that the image capturing unit is switched to the first position, trigger the image capturing unit to operate in a capturing state for capturing the image in the image capturing area.

Optionally, the electronic device further includes a case, where the fixing apparatus is a part of the case or the fixing apparatus is connected with the case, and the processing apparatus is arranged in the case.

Optionally, the fixing apparatus has a preset shape, and when the user wears the electronic device, the fixing apparatus having the preset shape is adapted to maintain a position relationship between the electronic device and at least part of head of the user.

Optionally, the supporting unit is a rotatable supporter, a first end of the rotatable supporter is connected with the case, a second end of the rotatable supporter is connected with the image capturing unit, and the first end and the second end are opposite to each other, the rotatable supporter is capable of rotating with the first end as a base, to make the position of the image capturing unit with respect to the electronic device includes at least a first position and a second position.

Optionally, the supporting unit is a retractable supporter, a first end of the retractable supporter is connected with the case, a second end of the retractable supporter is connected with the image capturing unit, and the first end and the second end are opposite to each other, the retractable supporter is capable of shrinking and extending, to make the position of the image capturing unit with respect to the electronic device includes at least a first position and a second position based on different amplitudes of the shrinking and extending of the retractable supporter.

Optionally, the fixing apparatus having the preset shape includes a hanging unit, the hanging unit has a hanging structure of a first preset shape, and the electronic device is capable of being fixed on an auricle of the user by the hanging structure, a position relationship between the hanging unit and the audio output apparatus is set in such a manner that an external auditory canal of the user is in the audio output area of the audio output apparatus to make the user sense the sound output from the audio output apparatus.

Optionally, the fixing apparatus having the preset shape includes a bulge unit, the bulge unit has a bulge structure of a second preset shape, and the audio output apparatus is arranged in the bulge structure, the bulge structure is capable of being inserted into an external auditory canal of the user to make the user sense the sound output from the audio output apparatus.

Optionally, in a case that the user wears the electronic device and the image capturing unit is in the first position, a position relationship between the fixing apparatus and the image capturing unit is set in such a manner that a capturing direction of the image capturing unit is consistent with a direction of visual field of the user, and the image capturing area includes the visual field of the user.

Optionally, in a case that the user wears the electronic device and the image capturing unit is in the first position, a position relationship between the fixing apparatus and the image capturing unit is set in such a manner that the image capturing area does not include a part of the body where the user wears the fixing apparatus, and also does not include a part within a preset range from the part of the body where the user wears the fixing apparatus.

Optionally, the processing apparatus is at least adapted to control the image capturing apparatus, and the processing apparatus is adapted to crop an image captured in the image capturing area by the image capturing apparatus to obtain an image at least corresponding to visual field of the user.

Optionally, the processing apparatus is adapted to crop, based on a position relationship between the image capturing apparatus and at least one eye of the user, the image captured in the image capturing area by the image capturing apparatus to obtain an image at least corresponding to the visual field of the user.

Optionally, the processing apparatus is at least adapted to control the image capturing apparatus, and the electronic device further includes a first interface, where the image capturing apparatus is detachably connected to the first interface and the processing apparatus is adapted to control the image capturing apparatus via the first interface.

Optionally, the processing apparatus is at least adapted to control the image capturing apparatus, and the electronic device further includes an audio input apparatus adapted to capture an audio signal, the processing apparatus is adapted to, if it is identified that the audio signal captured by the audio input apparatus satisfies a preset condition, trigger the image capturing apparatus to operate in a capturing state for capturing the image in the image capturing area.

Optionally, the processing apparatus is at least adapted to control the data transmission apparatus, and the processing apparatus is adapted to control the data transmission apparatus to perform audio data and/or image data transmission with the second electronic device.

An electronic device is provided. The electronic device includes a fixing apparatus, a first interface, a data transmission apparatus, an audio output apparatus and a processing apparatus.

The fixing apparatus is adapted to, in a case that a user wears the electronic device, maintain a position relationship between the electronic device and at least part of body of the user.

The first interface is adapted to detachably connect to an image capturing apparatus, where the image capturing apparatus has an image capturing area and is adapted to capture an image in the image capturing area.

The data transmission apparatus is adapted to, in a case that a data connection is established between the electronic device and a second electronic device, perform data transmission with the second electronic device.

The audio output apparatus having an audio output area is adapted to output sound to the audio output area.

The processing apparatus is adapted to control at least one of the data transmission apparatus, the audio output apparatus and the image capturing apparatus connected to the first interface.

The electronic device includes no image displaying apparatus.

An image capturing apparatus is provided. The image capturing apparatus includes an image capturing unit and a second interface connected to the image capturing unit.

The image capturing unit having an image capturing area is adapted to capture an image in the image capturing area.

The second interface is adapted to connect an electronic device.

The electronic device includes a fixing apparatus, a first interface, a data transmission apparatus, an audio output apparatus and a processing apparatus.

The fixing apparatus is adapted to, in a case that a user wears the electronic device, maintain a position relationship between the electronic device and at least part of body of the user.

The first interface is adapted to detachably connect the second interface of the image capturing apparatus.

The data transmission apparatus is adapted to, in a case that a data connection is established between the electronic device and a second electronic device, perform data transmission with the second electronic device.

The audio output apparatus having an audio output area is adapted to output sound to the audio output area.

The processing apparatus is adapted to control at least one of the data transmission apparatus, the audio output apparatus and the image capturing apparatus connected to the first interface.

The electronic device includes no image displaying apparatus.

From the above technical solutions, an electronic device and an image capturing apparatus are provided. The electronic device includes: a fixing apparatus, adapted to, in a case that a user wears the electronic device, maintain a position relationship between the electronic device and at least part of body of the user; an image capturing apparatus having an image capturing area, adapted to capture an image in the image capturing area; a data transmission apparatus, adapted to, in a case that a data connection is established between the electronic device and a second electronic device, perform data transmission with the second electronic device; an audio output apparatus having an audio output area, adapted to output sound to the audio output area; and a processing apparatus, adapted to control at least one of the image capturing apparatus, the data transmission apparatus and the audio output apparatus, wherein the electronic device comprises no image displaying apparatus. According to the embodiment of the disclosure, the image capturing apparatus is provided in a wearable electronic device including the audio output apparatus. The image may be captured by the image capturing apparatus when the user wears the electronic device. No additional device is required, the electronic device is portable and it is convenient to perform image capturing. Therefore, the electronic device is effectively used, and the user experience is improved.

BRIEF DESCRIPTION OF DRAWINGS

For more clearly explaining embodiments of the disclosure or existing technologies, drawings to be used in description of the embodiments of the disclosure or the existing technologies are briefly explained hereinafter. Apparently, the drawings in the following description are merely exemplary, and other drawings may be obtained based on the described drawings by those skilled in the art without inventive efforts.

DETAILED DESCRIPTION

Technical solutions according to embodiments of the disclosure are clearly and completely described hereinafter in conjunction with drawings used in the embodiments of the disclosure. Apparently, described embodiments are merely part of, rather than all of embodiments of the disclosure. Any other embodiment obtained based on the embodiments of the disclosure by those skilled in the art without inventive efforts should fall within the scope of protection of the disclosure.

An electronic device provided according to an embodiment of the disclosure includes a fixing apparatus, an image capturing apparatus, a data transmission apparatus, an audio output apparatus and a processing apparatus. The fixing apparatus is adapted to, in a case that a user wears the electronic device, maintain a position relationship between the electronic device and at least part of body of the user. The image capturing apparatus having an image capturing area is adapted to capture an image in the image capturing area. The data transmission apparatus is adapted to, in a case that a data connection is established between the electronic device and a second electronic device, perform data transmission with the second electronic device. The audio output apparatus having an audio output area is adapted to output sound to the audio output area. The processing apparatus is adapted to control at least one of the image capturing apparatus, the data transmission apparatus and the audio output apparatus. The electronic device does not include an image displaying apparatus. According to the embodiment of the disclosure, the image capturing apparatus is provided in a wearable electronic device including the audio output apparatus. The image may be captured when the user wears the electronic device. The electronic device is portable and it is convenient to perform image capturing without affecting normal use of the electronic device. Therefore, the electronic device is effectively used, and the user experience is improved. Since the electronic device according to the embodiment of the disclosure includes no display apparatus, power consumption is lowered, and the size of the device is reduced, thereby improving the portability.

The embodiments of the disclosure are described in detail hereinafter in conjunction with the drawings.

Figure 1:
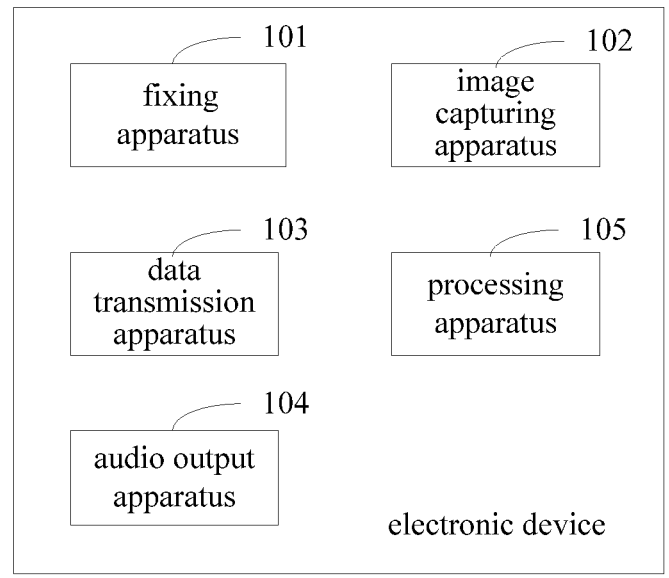
FIG. 1 is a schematic structure diagram of an electronic device according to an embodiment of the disclosure.

FIG. 1 is a schematic structure diagram of an electronic device according to an embodiment of the disclosure. The electronic device may include: a fixing apparatus 101, an image capturing apparatus 102, a data transmission apparatus 103, an audio output apparatus 104 and a processing apparatus 105.

The fixing apparatus 101 is adapted to, in a case that a user wears the electronic device, maintain a position relationship between the electronic device and at least part of body of the user.

The fixing apparatus has a preset shape and is wearable for the user.

In a possible implementation, the user may wear the fixing apparatus at the head. In a case that the user wears the electronic device, the fixing apparatus with the preset shape may be adapted to maintain a position relationship between the electronic device and at least part of the head of the user.

The fixing apparatus may be, for example, in an arc or circular shape, to be fixed on the head.

In a case that the user may wear the fixing apparatus on the head, the fixing apparatus may include a head-mounted component. With the head-mounted component, the electronic device can be fixed on the side of the head of the user. The face of the user is regarded as the front, the back of the head is regarded as the back, and the side of the head is the position where the left ear or the right ear locates. With the head-mounted component, the electronic device may be fixed on one side or two sides of the head of the user. The head-mounted component may be a component having the preset shape provided in the fixing apparatus.

Obviously, the user may wear the fixing apparatus around a wrist or on other parts of the body.

The image capturing apparatus 102 having an image capturing area is adapted to capture an image in the image capturing area.

The image capturing area is a conical or quasi-conical space area diverging from the image capturing apparatus, which is determined by a horizontal capturing angle and a vertical capturing angle of the image capturing apparatus.

The data transmission apparatus 103 is adapted to, in a case that a data connection is established between the electronic device and a second electronic device, perform data transmission with the second electronic device.

It should be noted that, the second electronic device is another electronic device different from the electronic device according to the embodiment of the disclosure. The definition of the second electronic device is for convenient description.

Data connection between the electronic device according to the embodiment of the disclosure and the second electronic device can be achieved by the data transmission apparatus. The data connection may be a wireless connection or a wired connection. The data transmission apparatus may perform data transmission with the second electronic device via the data connection.

The audio output apparatus 104 having an audio output area is adapted to output sound to the audio output area.

The audio output area may be an area where the sound output by the audio output apparatus can reach. The audio output area at least includes a conical or quasi-conical area diverging from the audio output apparatus.

The processing apparatus 105 is adapted to control at least one of the image capturing apparatus 102, the data transmission apparatus 103 and the audio output apparatus 104.

The processing apparatus is connected to at least one of the image capturing apparatus, the data transmission apparatus and the audio output apparatus to control the at least one of the image capturing apparatus, the data transmission apparatus and the audio output apparatus.

In a case that the processing apparatus can control the data transmission apparatus, the processing apparatus is adapted to control the data transmission apparatus to perform audio data and/or image data transmission with the second electronic device. The image data may include the image captured by the image capturing apparatus.

The electronic device according to the embodiment of the disclosure does not include an image displaying apparatus, that is, the electronic device does not include a display apparatus outputting contents of images, for example, a display screen. Therefore, an extra size due to the display apparatus is avoided, the portability of the electronic device is enhanced, and the power consumption is reduced.

As the electronic device includes the image capturing apparatus and the audio output apparatus, a first prompt apparatus, which is different from the display apparatus, may further be provided in the electronic device. The first prompt apparatus may be a visual prompt apparatus adapted to visually inform the user of a state of the image capturing apparatus, a state of the audio output apparatus, or a state of any other apparatus in the electronic device. For example, the first prompt apparatus may be an indicator lamp. Whether the indicator lamp is bright or out is used to inform whether the image capturing apparatus is operating. Alternatively, indicating effects of the indicator lamp may be used to inform different operating states of the image capturing apparatus. For example, if the indicator lamp is bright for a long time, it is indicated that the image capturing apparatus is performing video capturing; and if the indicator lamp is flashing, it is indicated that the image capturing apparatus is performing image capturing. In addition, if the electronic device is rechargeable, the indicator lamp may be used to inform a charging state of the electronic device.

It should be noted that, the electronic device obviously includes some other necessary components to implement connections or structures between the apparatus, for example, necessary connecting pieces, a power apparatus supplying power to each apparatus, or an interface apparatus capable of obtaining power from other apparatus.

Obviously, the electronic device may include other components such as a storage apparatus. In a case that the processing apparatus controls the image capturing apparatus and the storage apparatus, the image captured by the image capturing apparatus may be stored in the storage apparatus.

According to the embodiment, the image capturing apparatus is provided in the wearable electronic device including the audio output apparatus. The image capturing may be implemented when the user wears the electronic device. Therefore, the electronic device is portable and it is convenient to perform image capturing. The electronic device is effectively used, and the user experience is improved. The user can use the image capturing apparatus to perform image capturing when using the audio output apparatus, without affecting normal use of the electronic device. Since the electronic device according to the embodiment of the disclosure includes no display apparatus, power consumption is lowered, and the size of the electronic device is reduced, thereby improving the portability.

The electronic device may further include an audio input apparatus adapted to capture an audio signal.

There are many implementations for triggering the image capturing apparatus to operate in a capturing state for capturing the image in the image capturing area. The capturing state includes a prepared capturing state in which the image capturing apparatus is initiated and the image in the image capturing area can be captured, and an actual capturing state in which the image in the image capturing area is captured in a case that a capturing instruction is received.

In one possible implementation, an on-off control apparatus may be further provided in the electronic device or the image capturing apparatus. With the on-off control apparatus, the user can turn on or turn off the image capturing apparatus to achieve the image capturing in the image capturing area.

In another possible implementation, in a case that the electronic device includes the audio input apparatus, the processing apparatus may at least control the image capturing apparatus and the audio input apparatus.

The processing apparatus may be adapted to, if it is identified that the audio signal captured by the audio input apparatus satisfies a preset condition, trigger the image capturing apparatus to operate in the capturing state in which the image in the image capturing area is captured.

For example, an audio signal of "initiating photographing" is given, and the image capturing apparatus may be triggered to operate in the capturing state in a case that the processing apparatus identifies a keyword of "photographing" included in the audio signal.

Apparently, other implementations may be used to trigger the image capturing apparatus to capturing the image, which are described in detail according to following embodiments of the disclosure.

In a case that the processing apparatus controls the image capturing apparatus, data connection may be established between the image capturing apparatus and the processing apparatus.

The image captured in the image capturing area by the image capturing apparatus may at least include the image in a visual field of the user. The processing apparatus may be adapted to crop the image captured in the image capturing area by the image capturing apparatus to obtain at least the image in the visual field of the user.

For obtaining the image matched with the visual field of the user and improving the accuracy of cropping, the processing apparatus may be adapted to crop, based on a position relationship between the image capturing apparatus and at least one eye of the user, the image captured in the image capturing area by the image capturing apparatus, to obtain an image at least corresponding to the visual field of the user.

The processing apparatus may crop the image captured in the image capturing area by the image capturing apparatus based on the position relationship, to obtain a sub-image including partial contents in a first direction of the captured image. The first direction is opposite to a direction from the image capturing apparatus to at least one eye of the user. The sub-image obtained through cropping approximately matches the visual field of the user.

For example, when the image capturing apparatus captures the image, in a case that the image capturing apparatus locates at a lower and left portion from the left eye of the user, the sub-image including partial contents on an upper and right portion of the captured image may be obtained through cropping. Specific positions for cropping may be further determined based on an angle of visual field of the user and a capturing angle of the image capturing apparatus.

Obviously, if the image capturing apparatus locates in the middle of two eyes during image capturing, the contents of a middle portion of the image captured in the image capturing area by the image capturing apparatus are obtained through cropping. In this case, since the image capturing apparatus locates at the right of the left eye and at the left of the right eye, it may be determined that the contents of the middle portion of the image are obtained through cropping.

The position relationship between the image capturing apparatus and the eye of the user may be determined through a detection apparatus such as a gravity sensor. For example, when the user wears the electronic device on head, it may be detected whether the image capturing apparatus locates on a side of the left ear or on a side of the right ear. Accordingly, it may be determined whether the image capturing apparatus locates below or above the eye of the user, or locates on the right or on the left of the eye of the user.

In practice, the second electronic device may be an audio player. The electronic device according to the embodiment of the disclosure may be connected to the audio player via the data transmission apparatus, may obtain an audio file of the audio player by controlling the data transmission apparatus, and may output, through the audio output apparatus, the sound of the audio file. Therefore, the electronic device may be a head-mounted audio output apparatus such as a headset.

Figure 2:
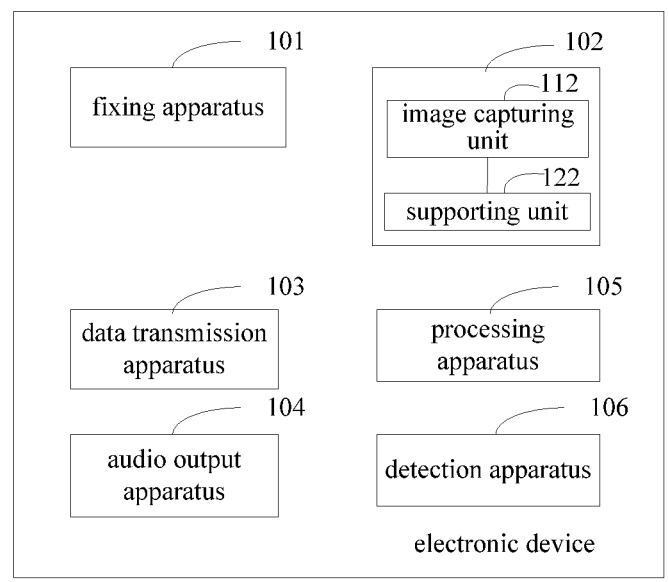
FIG. 2 is a schematic structure diagram of an electronic device according to an embodiment of the disclosure.
Figure 3:
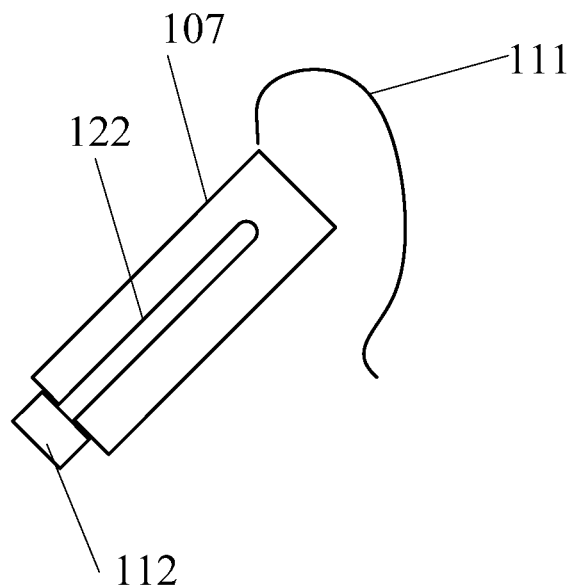
FIG. 3 to FIG. 9 are respective schematic structure diagrams of an electronic device in practical application according to an embodiment of the disclosure.
Figure 4:
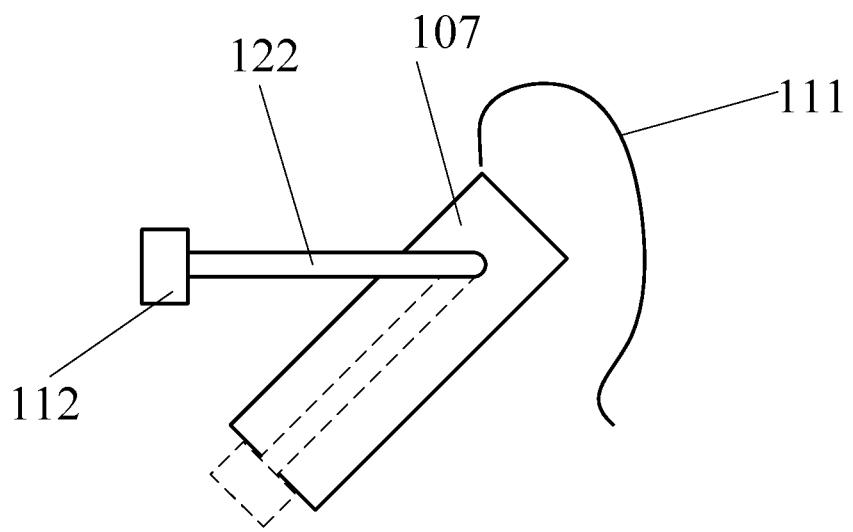

FIG. 2 is a structure diagram of an electronic device according to another embodiment of the disclosure.

Different from the electronic device shown in FIG. 1, the image capturing apparatus of the electronic device according to the embodiment of the disclosure may include an image capturing unit 112 and a supporting unit 122 connected to the image capturing unit.

An image capturing area of the image capturing unit 112 is regarded as the image capturing area of the image capturing apparatus. The image capturing unit 112 may include a camera.

A position of the supporting unit 122 with respect to the electronic device may change. Due to different positions of the supporting unit 122 with respect to the electronic device, a position of the image capturing unit 112 with respect to the electronic device includes at least a first position and a second position.

An operation state of the image capturing unit 112 may vary with the position of the image capturing unit 112. For example, the image capturing unit 112 in the first position may be triggered on and operate in a capturing state where the image in the image capturing area is captured. While the image capturing unit 112 in the second position may be triggered off and image capturing is not performed. The first position state may be sensed by other users, thereby enhancing the security and protecting privacies of the other users. The second position state is different from the first position state.

The capturing state includes a prepared capturing state in which the image capturing unit 112 is initiated and the image in the image capturing area can be captured, and an actual capturing state in which the image in the image capturing area is captured in a case that a capturing instruction is received.

For further enhancing the portability of the electronic device, the processing apparatus 105 may control at least the image capturing apparatus 102. As shown in FIG. 2, the electronic device further includes a first detection apparatus 106, adapted to detect the position of the image capturing unit.

The processing apparatus 105 is adapted to, if it is detected by the first detection apparatus 106 that the image capturing unit 112 is switched to the first position, trigger the image capturing unit 112 to operate in the capturing state where the image in the image capturing area is captured.

The processing apparatus 105 may further trigger the image capturing unit 112 off in a case that the image capturing apparatus is switched to the second position.

Therefore, automatic initiation of the image capturing apparatus and automatic image capturing in the image capturing area may be implemented by changing the position of the image capturing apparatus with respect to the electronic device.

The first detection apparatus 106 may be a sensor capable of detecting the changing of the position, such as an angle sensor, a position sensor, etc.

Obviously, the image capturing unit may be initiated at any position to operate in the capturing state. The first position may be an optimized position for image capturing, and the quality of image capturing may be enhanced in the first position, thereby satisfying user requirements for capturing. The image capturing unit may be turned off at any position and accordingly image capturing is not performed. The second position may be an optimized position for turning off the image capturing unit.

In other possible implementations, in a case that the image capturing unit is in the first position, the image capturing unit is in a controllable state. That is, the image capturing unit may be controlled by the processing apparatus. For example, the image capturing unit may be trigger to operate in the capturing state, or the image captured by the image capturing unit may be processed.

With the fixing apparatus 101 included in the electronic device according to the embodiment of the disclosure, the user may wear the electronic device on at least part of the body of the user.

The electronic device may further include a case for connecting or protecting other apparatus. In different implementations, the fixing apparatus 101 may be a part of the case or may be connected with the case.

The processing apparatus 105 may be arranged in the case.

At least part of the audio output apparatus 104 and the data transmission apparatus 103 may be arranged in the case. The first detection apparatus 106 may be arranged either in the case or outside the case, only if the first detection apparatus 106 is connected with the processing apparatus 105.

For example, the audio output apparatus 104 may be arranged in the case. However, the audio output apparatus 104 needs to output the sound via an opening on the case. The data transmission apparatus may be arranged in the case if the data transmission apparatus is wireless. If the data transmission apparatus is wired, wire interface(s) included in the data transmission apparatus should be arranged at an opening of the case, and data connection wires should be arranged outside the case.

In a case that the electronic device is the head-mounted electronic device, that is, the fixing apparatus having a preset shape in the electronic device includes a head-mounted component, the electronic device may be fixed on one side of the head of the user by the head-mounted component. There are many implementations for the fixing apparatus, which are described in detail in conjunction with FIGS. 3 to 9.

FIGS. 3 to 9 illustrate multiple possible structures of the electronic device in practice. As shown in FIGS. 3 to 9, the electronic device according to the embodiment of the disclosure may have multiple structures. It should be noted that, FIGS. 3 to 9 merely illustrate exemplary structures of the electronic device, and obviously, the electronic device may be in other structures.

Possible implementations of the fixing apparatus are described in detail hereinafter in conjunction with FIGS. 3 to 9.

As shown in FIGS. 3 to 6, the electronic device includes the case 107, the fixing apparatus 101 connected with the case 107, and the image capturing apparatus connected with the case 107. The image capturing apparatus includes the image capturing unit 112 and the supporting unit 122 connected with the image capturing unit 112. The supporting unit 122 is connected with the case 107. The electronic device further includes the processing apparatus 105 (not shown in FIGS. 3 to 6) arranged in the case 107, and the data transmission apparatus (not shown in FIGS. 3 to 6) and the audio output apparatus (not shown in FIGS. 3 to 6) at least part of which are arranged in the case. Operations which may be performed among the apparatus may refer to the forgoing embodiments, which are not further described here.

The fixing apparatus 101 having a preset shape includes a hanging unit 111. The hanging unit 111 has a hanging structure of a first preset shape. With the hanging structure, the electronic device may be fixed on the auricle of the user. The position relationship between the hanging unit and the audio output apparatus is set in such a manner that the external auditory canal of the user locates in an audio output area of the audio output apparatus, and accordingly, the user can sense the sound output by the audio output apparatus.

The first preset shape may an arc or circular shape, which is suitable for the auricle, so that the hanging structure may be fixed on the auricle.

In a case that the user wears the electronic device and the electronic device is fixed on the auricle of the left ear or the right ear of the user with the hanging unit, the position relationship between the image capturing unit 112 and the hanging unit 111 is set, by adjusting the supporting unit, in such a manner that a capturing direction of the image capturing unit may be consistent with a visual field direction of the user, and accordingly, the image capturing area of the image capturing unit at least partially overlaps with the visual field of the user. In a possible implementation, the image capturing area includes the visual field of the user.

In a case that the processing apparatus controls the image capturing apparatus, the processing apparatus may be adapted to crop an image captured by the image capturing apparatus to obtain an image at least corresponding to the visual field of the user.

Figure 7:
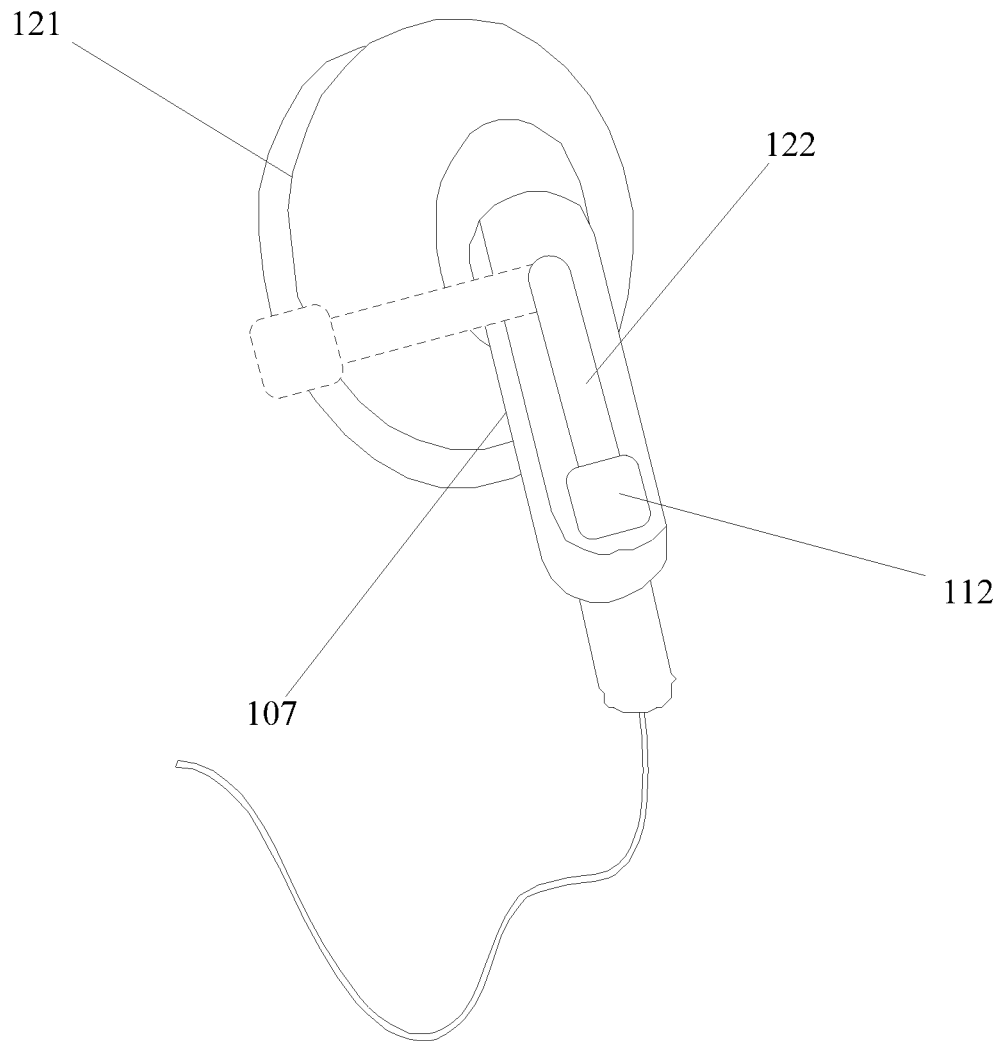

As shown in FIG. 7, the electronic device includes the case 107 and the image capturing apparatus connected with the case 107. The case includes at least a fixing apparatus. The image capturing apparatus includes the image capturing unit 112 and the supporting unit 122 connected with the image capturing unit 112. The supporting unit 122 is connected with the case 107. The electronic device further includes the processing apparatus (not shown in FIG. 7) arranged in the case 107, and the data transmission apparatus (not shown in FIG. 7) and the audio output apparatus (not shown in FIG. 7) at least part of which are arranged in the case 107. Operations which may be performed among the apparatus may refer to the forgoing embodiments, which are not further described here.

The fixing apparatus having a preset shape includes a bulge unit 121. The bulge unit 121 has a bulge structure of a second preset shape. The audio output apparatus is arranged in the bulge structure.

The bulge structure may be inserted into the external auditory canal of the user, and accordingly, the user can sense the sound output by the audio output apparatus.

Figure 8:
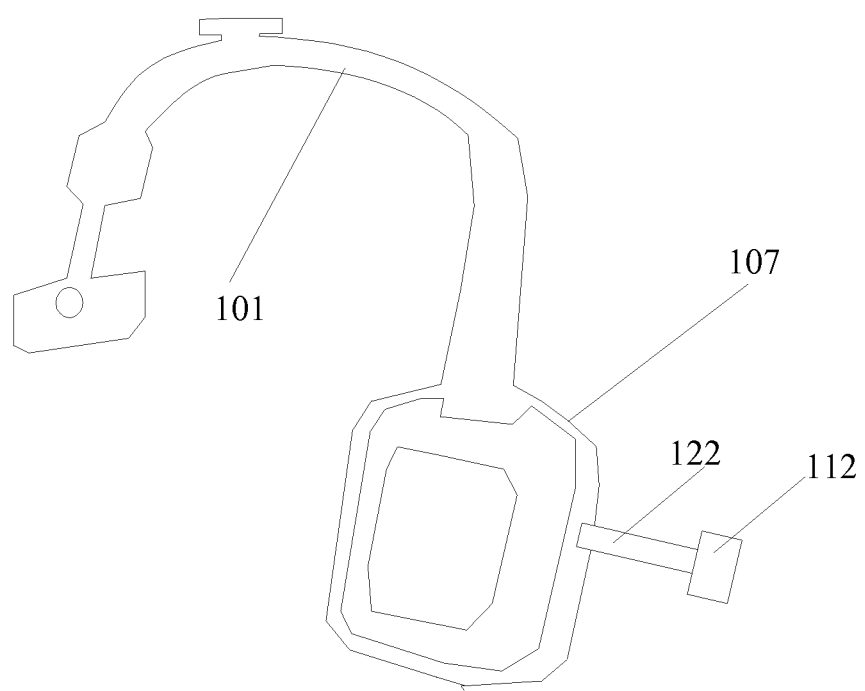
Figure 9:
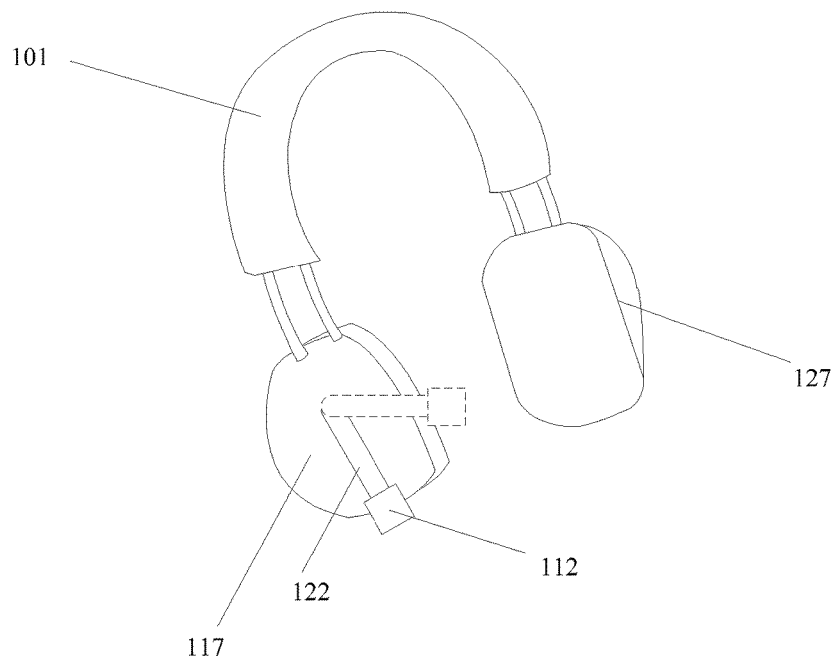

FIGS. 8 and 9 illustrate another two structures of the electronic device, and apparatus included in the electronic device may refer to those shown in FIG. 1 or FIG. 2.

As shown in FIG. 8, the electronic device includes the case 107, the fixing apparatus 101 connected with the case 107, and the image capturing apparatus connected with the case 107. The image capturing apparatus includes the image capturing unit 112 and the supporting unit 122 connected with the image capturing unit 112. The supporting unit 122 is connected with the case 107. The electronic device further includes the processing apparatus (not shown in FIG. 8) arranged in the case 107, and the data transmission apparatus (not shown in FIG. 8) and the audio output apparatus (not shown in FIG. 8) at least part of which are arranged in the case 107. Operations which may be performed among the apparatus may refer to the forgoing embodiments, which are not further described here.

The fixing apparatus 101 may be a circular component. A first end of the circular component is connected to the case. With the circular component, the electronic device may be fixed on the head of the user and the case may be placed against one ear of the user, while a second end of the circular component is placed against another ear of the user.

As shown in FIG. 9, the image capturing apparatus of the electronic device may include a first sub image capturing apparatus and a second sub image capturing apparatus. Each sub image capturing apparatus includes the image capturing unit 112 and the supporting unit 122. The case 107 may include a first sub case 117 and a second sub case 127.

In the electronic device shown in FIG. 9, the fixing apparatus 101 is a circular component. A first end of the circular component is connected with the first sub case 117 and a second end of the circular component is connected with the second sub case 127. When the user wears the electronic device, the first sub case is fixed on one ear and the second sub case is fixed on the other ear with the fixing apparatus.

In other possible implementations, the fixing apparatus may include a first sub fixing apparatus and a second sub fixing apparatus. The first sub fixing apparatus may be a part of the first sub case or may be connected with the first sub case. The second sub fixing apparatus may be a part of the second sub case or may be connected with the second sub case. When the user wears the electronic device, the first sub case may be fixed on one ear of the user through the first sub fixing apparatus, and the second sub case may be fixed on the other ear of the user through the second sub fixing apparatus.

The processing apparatus (not shown in FIG. 9) may be arranged in the first sub case 117. The first sub image capturing apparatus is connected with the first sub case 117. The second sub image capturing apparatus (not shown in FIG. 9) is connected with the second sub case 127.

For changing the position of the image capturing unit of the image capturing apparatus with respect to the electronic device, the supporting unit 122 may be a rotatable supporter in conjunction with the FIGS. 1 to 9 in a possible implementation. A first end of the rotatable supporter is connected with the case, and a second end of the rotatable supporter is connected with the image capturing unit 112. The first end and the second end are opposite to each other.

The rotatable supporter may rotate with the first end as a base, and accordingly, the image capturing unit 112 may locates in at least a first position and a second position with respect to the electronic device.

The rotatable supporter may be connected with one side of the case, so that the image capturing apparatus 102 locates outside the case.

For protecting the image capturing unit 112 and preventing the image capturing apparatus 102 outside the case from being damaged due to external reasons such as collision, the case may include a groove. The first end of the rotatable supporter is connected to the inside of the groove. The image capturing apparatus 102 may be embedded into the groove by rotating the rotatable supporter.

The rotatable supporter may take the first end as the base, and rotate, on at least one plane, by 90 degrees, 180 degrees, 270 degrees, 360 degrees, etc.

As shown in FIG. 3, FIG. 4, FIG. 7 and FIG. 9, the image capturing unit locates in different positions with respect to the electronic device through the rotation of the rotatable supporter.

Figure 10:
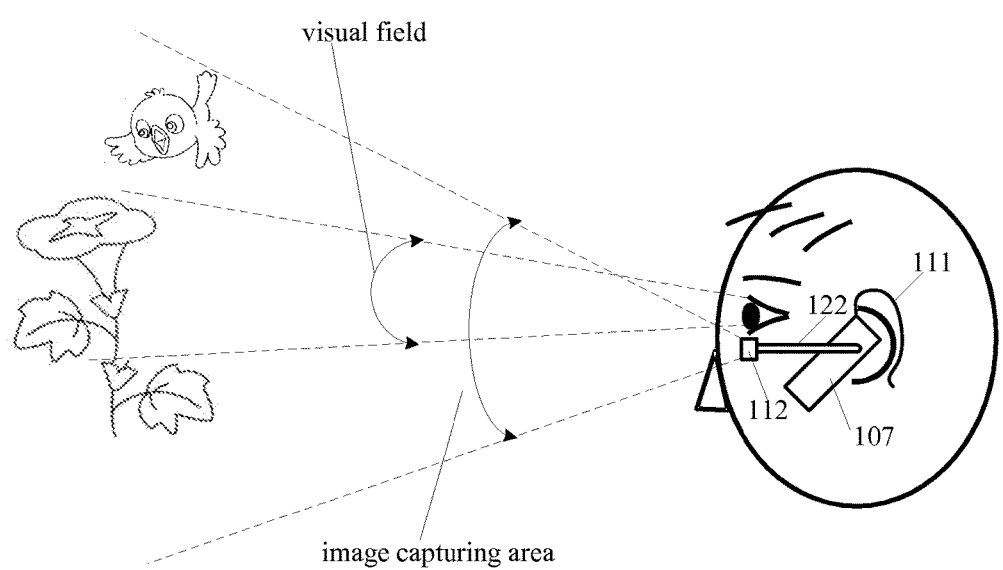
FIG. 10 is a schematic diagram showing that a user wears an electronic device according to an embodiment of the disclosure.

In a case that the image capturing unit 112 locates in the first position, the capturing direction of the image capturing unit is a direction that the visual field of the user is parallel when the user wears the electronic device. The image capturing unit may be triggered to operate in a capturing state when the image capturing unit 112 locates in the first position. FIG. 10 is a diagram showing that the user wears the electronic device.

As shown in FIG. 10, in a case that the image capturing unit 112 locates in the first position, an image capturing area of the image capturing unit 112 includes the visual field of the user.

The processing apparatus may crop the image captured by the image capturing unit 112 to obtain an image at least corresponding to the visual field of the user.

In another possible implementation, the supporting unit 122 may be a retractable supporter. A first end of the retractable supporter is connected with the case, and a second retractable supporter is connected to the image capturing unit 112. The first end and the second end are opposite to each other.

Since the retractable supporter is scalable, the image capturing unit 112 may locate at least in a first position and a second position with respect to the electronic device because of the shrinking or extending of the retractable supporter.

For protecting the image capturing unit 112, the retractable supporter may be arranged in the case and may extend outside the case through an opening of the case. The image capturing unit 112 may locate inside the case in a case that the retractable supporter is completely shrunk.

Figure 5:
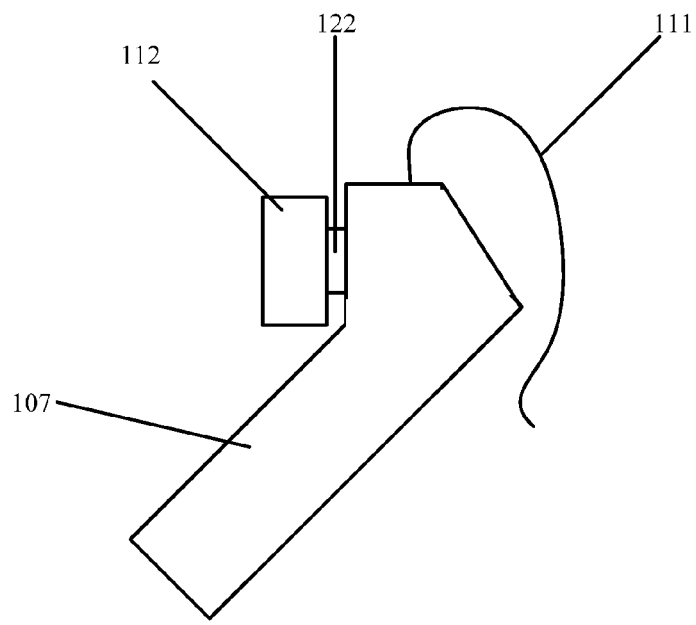
Figure 6:
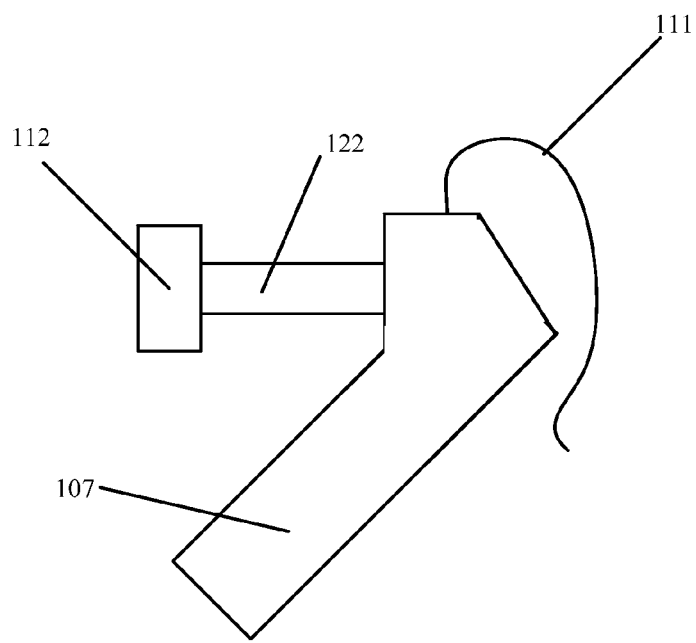

As shown in FIG. 5, FIG. 6 and FIG. 8, the image capturing unit 112 locates in different positions with respect to the electronic device because of the shrinking or extending of the retractable supporter.

In a case that the retractable supporter is completely extended, it is determined that the image capturing unit 112 locates in the first position. Any position in which the retractable supporter is not completely extended may be set as the second position. Obviously, a position in which the scalable supporter is completely shrunk may be set as the second position.

For enhancing the accuracy of image capturing, in a case that the user wears the electronic device of the embodiment and the image capturing unit locates in the first position with respect to the electronic device, in a possible implementation, the position relationship between the fixing apparatus and the image capturing unit is set in such a manner that the capturing direction of the image capturing unit is consistent with a visual field direction of the user, and accordingly, the image capturing area of the image capturing unit at least partially overlaps with the visual field of the user, and the image capturing area may include the visual field of the user.

In a case that the image capturing area includes the visual field of the user, an angle of view of the image capturing unit may satisfy a preset parameter condition. The preset parameter condition may be that the angle of view of the image capturing unit is larger than an effective angel of view of two eyes of the user (approximately 90 degrees horizontally and 70 degrees vertically) or is larger than an angle of peripheral vision of two eyes of the user (approximately 180 degrees horizontally and 90 degrees vertically). Hence, a camera of the image capturing unit may be wide-angle lens.

In a case that the user wears the electronic device on the body and the image capturing unit is adjusted to locate in the first position with respect to the electronic device, for avoiding part of the body from being captured by the image capturing unit, the position relationship between the fixing apparatus and the image capturing unit is set in such a manner that the image capturing area of the image capturing unit does not include the part of the body where the user wears the fixing apparatus, and the image capturing area of the image capturing unit does not include a part within a preset range from the part of the body where the user wears the fixing apparatus.

For example, in the electronic device shown in FIGS. 3 to 9, in a case that the fixing apparatus 101 includes the head-mounted component, the electronic device may be fixed on at least one side of the head of the user with the head-mounted component. The electronic device may be fixed on the left ear and/or the right ear of the user, and accordingly, the case is placed against the left ear and/or the right ear of the user. Therefore, in a case that the user wears the electronic device and the image capturing unit 112 is adjusted to locate in the first position with respect to the electronic device, the left ear and/or the right ear of the user is not captured by the image capturing unit 112, and part of the body in a preset range from the left ear and/or the right ear of the user, such as temple of the user, is not captured by the image capturing unit 112.

Hence, the first position according to the embodiment of the disclosure may be an optimized position for capturing. By rotating the rotatable supporter or by extending the retractable supporter, the image capturing unit may locate in the first position, and accordingly, the part of the body is not captured by the image capturing unit.

It should be noted that, the capturing state may be initiated or stopped when the image capturing unit according to the embodiment of the disclosure locates in any position. The initiation may be controlled by the user, or the capturing state may be automatically initiated.

In possible implementations, the processing apparatus is at least adapted to control the image capturing unit. The processing apparatus may be adapted to crop the image captured in the image capturing area by the image capturing unit to obtain an image at least corresponding to the visual field of the user.

In a case that the user wears the electronic device on the head, different images may be captured because of different positions of the image capturing unit with respect to the eye of the user. Therefore, the processing apparatus may crop the image captured by the image capturing unit based on a position relationship between the image capturing unit and at least one eye of the user to improve the efficiency and accuracy of cropping.

The processing apparatus may crop the image captured in the image capturing area by the image capturing apparatus, to obtain a sub-image including partial contents in a first direction based on the position relationship. The first direction is opposite to a direction from the image capturing apparatus to at least one eye of the user. The sub-image obtained through cropping matches the visual field of the user.

As shown in FIG. 10, the user wears the electronic device on one ear (supposing the left ear), and the image capturing unit 112 locates at the bottom left of the left eye.

The processing apparatus may obtain, through cropping, a sub-image including partial contents of an upper and right portion of the captured image as the image matching the visual field of the user.

Figure 10A:
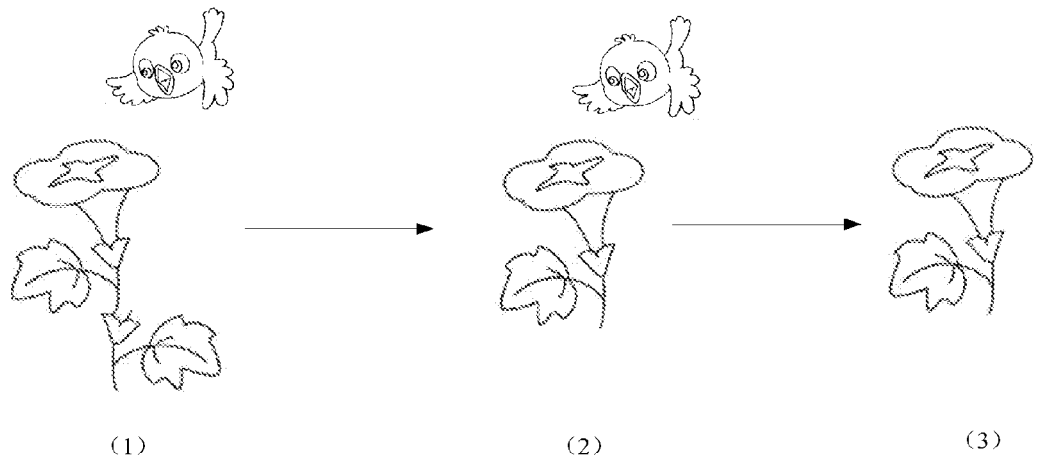
FIG. 10a is a schematic diagram of image cropping according to an embodiment of the disclosure.

As shown in FIG. 10a, 10a-(2) illustrates the sub-image including partial contents of an upper portion of the image shown in 10a-(1). The image shown in 10a-(2) further matches the visual field of the user.

Obviously, the captured image may be further cropped based on the angle of view of the user and the angle of view of lens of the image capturing unit, to obtain an image further matching the visual field of the user. For example, the image shown in 10*a*-(3) is obtained by cropping the image shown in 10*a*-(2).

In a case that the user wears the electronic device on the left ear or the right ear of the user, the image capturing apparatus may locate at the left ear or at the right ear. The electronic device may include a second detection apparatus for determining a position relationship between the image capturing apparatus and the eye of the user.

The position where the user wears the image capturing apparatus may be detected by the second detection apparatus provided in the electronic device. Accordingly, the position of the image capturing apparatus with respect to the eye of the user is determined.

For example, if it is detected that the image capturing apparatus locates at the left ear of the user, it may be determined that the image capturing apparatus locates at the left of the left eye.

It may be determined that the image capturing apparatus locates above or below the left eye of the user in conjunction with the position of the image capturing apparatus with respect to the electronic device during image capturing.

The second detection apparatus may be a gravity sensor.

In another possible implementation, the position relationship between the fixing apparatus and the image capturing unit is set in such a manner that the image capturing area of the image capturing unit does not include the visual field of the user. Therefore, the image in an invisible area of the user may be captured to implement monitoring. Here, the electronic device may further include a second prompt apparatus.

In a case that the processing apparatus controls the image capturing apparatus, the second prompt apparatus may be triggered to give a prompt if a preset condition is satisfied based on the contents of the image captured by the image capturing unit.

The second prompt apparatus may be the first prompt apparatus. In a case that the first prompt apparatus is a visual prompt apparatus, it may give a prompt by specific indicating effects of an indicator lamp.

Alternatively, the second prompt apparatus may be a audio prompt apparatus, which may give a prompt by outputting sound.

Alternatively, the second prompt apparatus may be a tactile prompt apparatus. For example, the second prompt apparatus may include vibrating motors and may give a prompt through vibration.

The capturing direction of the image capturing unit may be opposite to a direction of the visual field of the user. Therefore, the image behind the visual field of the user may be captured.

In a case that the user wears the electronic device on the body and the image capturing unit is adjusted to locate in the first position with respect to the electronic device, for avoiding part of the body from being captured by the image capturing unit, the position relationship between the fixing apparatus and the image capturing unit may be set in a manner that the image capturing area of the image capturing unit does not include the part of the body where the user wears the fixing apparatus, and the image capturing area of the image capturing unit does not include a part within a preset range from the part of the body where the user wears the fixing apparatus.

In further another possible implementation, the image capturing apparatus of the electronic device includes a first sub image capturing apparatus and a second sub image capturing apparatus; and the case includes a first sub case and a second sub case, such as the electronic device shown in FIG. 9.

The processing apparatus may be arranged in the first sub case. The first sub image capturing apparatus is connected with the first sub case, and the second sub image capturing apparatus is connected with the second sub case.

When the user wears the electronic device, the fixing apparatus may be used to fix the first sub case on one ear and fix the second sub case on the other ear.

Here, the position relationships between the fixing apparatus and the first sub image capturing apparatus and between the fixing apparatus and the second sub image capturing apparatus are set in such a manner that the first sub image capturing apparatus and the second sub image capturing apparatus are consistent with the direction of the visual field of the user, and the image capturing areas of the first sub image capturing apparatus and the second sub image capturing apparatus at least partially overlaps the visual field of single eye of the user.

In possible implementations, the processing apparatus may at least control the first sub image capturing apparatus and the second sub image capturing apparatus. The processing apparatus is adapted to combine a first sub image captured by the first sub image capturing apparatus and a second sub image captured by the second sub image capturing apparatus into an image at least corresponding to the visual field of the user.

The process of combining the first sub image and the second sub image by the processing apparatus includes: respectively cropping the first sub image and the second sub image, and performing image stitching to obtain the image corresponding to the visual field of the user.

The processing apparatus may respectively crop the first sub image and the second sub image into the images corresponding to the visual field of single eye of the user. Alternatively, the processing apparatus may cut off, based on the contents of the first sub image and the second sub image, the contents in the first sub image overlapping the second sub image or the contents in the second sub image overlapping the first sub image. Accordingly, the first sub image and the second sub image may be stitched into the image corresponding to the visual field of the user.

The process of cropping the first sub image and the second sub image into the images each corresponding to the visual field of single eye of the user by the processing apparatus may includes: cropping based on a position relationship between the first sub image capturing apparatus and one eye (suggesting the left eye) of the user, and cropping based on a position relationship between the second sub image capturing apparatus and the right eye of the user. The processing apparatus may obtain, from the first sub image, a sub image including partial contents in a first direction through cropping; and the first direction is opposite to a direction from the first sub image capturing apparatus to the left eye of the user. The processing apparatus may obtain, from the second sub image, a sub image including partial contents in a first direction through cropping; and the first direction is opposite to a direction from the second sub image capturing apparatus to the right eye of the user.

For example, if the first sub image capturing apparatus locates below the left eye of the user, the sub image including the contents of an upper and right portion of the first sub image is obtained through cropping from the first sub image. The obtained sub image approximately matches the visual field of the left eye of the user.

In another possible implementation, for reducing the complexity of the image capturing unit and lowering the cost, the image capturing apparatus may satisfy the following condition.

In a case that the user wears the electronic device and the image capturing unit locates in the first position with respect to the electronic device, the position relationship between the fixing apparatus and the image capturing unit is set in such a manner that the capturing direction of the image capturing unit may be consistent with a direction of visual field of the user, and accordingly, the image capturing area of the image capturing unit at least partially overlaps the visual field of the user. In a situation, the image capturing area includes the visual field of the left eye or the right eye of the user.

That is, in a case that the user wears the electronic device and the image capturing unit is adjusted to locate in the first position, the image capturing unit may merely capture the image corresponding to the visual field of single eye of the user. Therefore, wide-angle lens is not required for the image capturing unit and accordingly the complexity of the apparatus is reduced.

The processing apparatus may control an image processing apparatus. Data connection may be established between the processing apparatus and the image capturing unit. The processing apparatus may further perform image stitching on a third sub image including the visual field of the left eye and a fourth sub image including the visual field of the right eye captured by the image capturing unit.

In combining the third sub image and the fourth sub image, the processing apparatus may respectively crop the third sub image and the fourth sub image into the images corresponding to the visual field of single eye of the user. Alternatively, the processing apparatus may cut off the contents in the third sub image overlapping the fourth sub image or the contents in the fourth sub image overlapping the third sub image. Accordingly, the first sub image and the second sub image may be stitched into an image corresponding to the visual field of the user. Then the third sub image and the fourth sub image after cropping may be stitched into an image corresponding to the visual field of the user.

The process of respectively cropping the third sub image and the fourth sub image into the images corresponding to the visual field of single eye of the user by the processing apparatus may include: cropping based on the position relationship between the image capturing apparatus and the eyes of the user.

The third sub image corresponds to the visual field of the left eye. That is, in a case that the user wears the electronic device on the left ear, the processing apparatus crops the third sub image, to obtain a sub image including partial contents in a first direction. The first direction is opposite to a direction from the image capturing apparatus to the left eye of the user.

The fourth sub image corresponds to the visual field of the right eye. That is, in a case that the user wears the electronic device on the right ear, the processing apparatus crops the fourth sub image, to obtain a sub image including partial contents in a first direction. The first direction is opposite to a direction from the image capturing apparatus to the right eye of the user.

The position relationship between the image capturing apparatus and the left eye of the user or between the image capturing apparatus and the right eye of the user may be detected by the second detection apparatus provided in the electronic device.

According to the embodiment of the disclosure, for portability and convenience in use, the electronic device may include a first interface. The image capturing apparatus is detachably connected with the first interface. The processing apparatus may control the image capturing apparatus via the first interface.

According to the embodiment of the disclosure, the image capturing apparatus is provided in the wearable electronic device having audio processing function. The image capturing may be implemented when the user wears the electronic device. The electronic device is portable and it is convenient to perform image capturing. The electronic device is effectively used, and the user experience is improved. The user can use the image capturing apparatus to perform image capturing while using the audio output apparatus, without affecting normal use of the electronic device. Since the electronic device according to the embodiment of the disclosure includes no display apparatus, power consumption is lowered, and the size of the electronic device is reduced, thereby improving the portability. The electronic device according to the embodiment of the disclosure may further include a storage apparatus. Therefore, the processing apparatus may store the image captured by the image capturing apparatus in the storage apparatus.

In addition, the processing apparatus may transmit, by the data transmission apparatus, the image captured by the image capturing apparatus to a second electronic device, and the captured image may be displayed or stored in the second electronic device.

Figure 11:
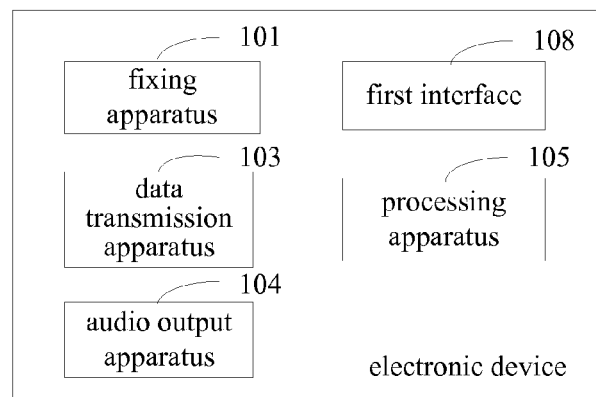
FIG. 11 is a schematic structure diagram of an electronic device according to an embodiment of the disclosure.

FIG. 11 is a schematic structure diagram of an electronic device according to an embodiment of the disclosure. The electronic device may include a fixing apparatus 1101, a first interface 1102, a data transmission apparatus 1103, an audio output apparatus 1104 and a processing apparatus 1105.

The fixing apparatus 1101 is adapted to, in a case that a user wears the electronic device, maintain a position relationship between the electronic device and at least part of body of the user.

The first interface 1102 is adapted to detachably connect the image capturing apparatus 1100.

The data transmission apparatus 1103 is adapted to, in a case that a data connection is established between the electronic device and a second electronic device, perform data transmission with the second electronic device.

The audio output apparatus 1104 having an audio output area, is adapted to output sound to the audio output area.

The processing apparatus 1105 is adapted to control at least one of the data transmission apparatus, the audio output apparatus and the image capturing apparatus connected to the first interface.

The electronic device includes no image displaying apparatus.

The electronic device may further include a processing apparatus arranged in a case and an audio apparatus arranged in the case.

The processing apparatus is connected with at least one of the image capturing apparatus connected to the first interface, the data transmission apparatus and the audio apparatus.

The audio apparatus may include an audio output apparatus and/or an audio input apparatus.

In addition, the electronic device may further include a first detection apparatus connected with the processing apparatus, for detecting the position of the image capturing unit.

The processing apparatus is adapted to, if it is detected by the first detection apparatus that the image capturing unit is switched to a first position, trigger the image capturing unit to operate in a capturing state for capturing the image in an image capturing area.

Different from the electronic device according to the former embodiment of the disclosure, the electronic device according to the embodiment of the disclosure does not include the image capturing apparatus, but the electronic device includes the first interface which may be detachably connected the image capturing apparatus. Therefore, the image capturing apparatus is connected to the first interface in a case that image capturing is required. Operations of other apparatus may refer to the description of the above embodiments and are not given here.

The processing apparatus may control the image capturing apparatus via the first interface. For example, the processing apparatus may control the image capturing apparatus to initiate and obtain the image captured by the image capturing apparatus.

In addition, a wireless communication connection may further be established between the data transmission apparatus and the image capturing apparatus so that the image capturing apparatus may be independently located. Therefore, in a case that the image capturing apparatus is separated from the electronic device, the processing apparatus may obtain, through the communication connection established between the data transmission apparatus and the image capturing apparatus, the image captured by the image capturing apparatus, and store the captured image in the electronic device. Here the electronic device further includes a storage apparatus.

Figure 12:
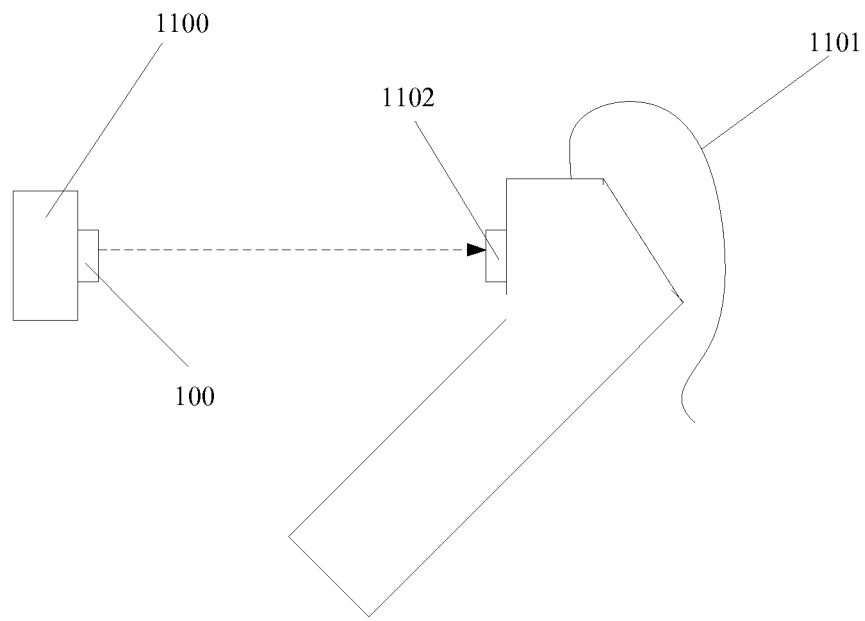
FIG. 12 is a schematic structure diagram of an electronic device in practical application according to an embodiment of the disclosure.

FIG. 12 illustrates another structure of the electronic device in practical application according to an embodiment of the disclosure. As shown in FIG. 12, the electronic device may be detachably connected to the image capturing apparatus 1100 via the first interface 1102. The image capturing apparatus 1100 may include a second interface 100, through which the image capturing apparatus 1100 is connected to the first interface 1102 of the electronic device.

Obviously, the structure of the electronic device may be similar to those shown in FIGS. 3 to 9. However, the electronic device does not include the image capturing apparatus, and the first interface is arranged at an opening provided in a corresponding position of the case. Data connection may be established between the first interface and the processing apparatus.

According to the embodiment of the disclosure, the image capturing apparatus may be connected to the wearable electronic device including the audio output apparatus. The image capturing may be implemented when the user wears the electronic device. The electronic device is portable and it is convenient to perform image capturing. The electronic device is effectively used, and the user experience is improved. Since the electronic device according to the embodiment of the disclosure includes no display apparatus, power consumption is lowered, and the size of the electronic device is reduced, thereby improving the portability.

The electronic device according to the embodiment of the disclosure may perform audio data or image data transmission with a second electronic device by controlling the data transmission apparatus.

In a case that the second electronic device is an audio player, the electronic device may be connected to the audio player via the data transmission apparatus, the processing apparatus may obtain, by the data transmission apparatus, an audio file of the second electronic device, and may trigger the audio output apparatus to output sound. Here the data transmission apparatus may be a module which can be wireless connected with the second electronic device in short distance, such as a Bluetooth module and an infrared module; or may be a transmission apparatus including data connection wires to implement a wired connection with the second electronic device.

In a case that the second electronic device is a display or storage apparatus, the electronic device may transmit, by controlling the image capturing apparatus, image data captured by the image capturing apparatus to the second electronic device through the data transmission apparatus, to display or store the captured image.

Figure 13:
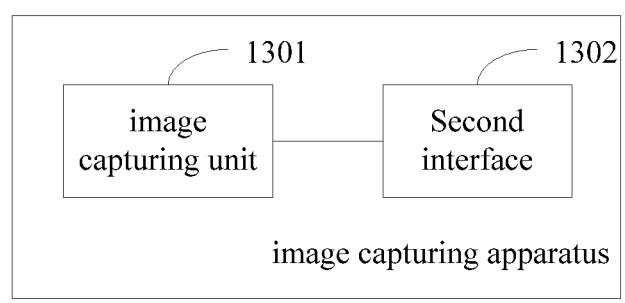
FIG. 13 is a schematic structure diagram of an image capturing apparatus according to an embodiment of the disclosure.

An image capturing apparatus is further provided according to an embodiment of the disclosure. As shown in FIG. 13, the image capturing apparatus includes an image capturing unit 1301 and a second interface 1302 connected to the image capturing unit. The second interface 1302 is adapted to connect the electronic device.

The electronic device includes a fixing apparatus, a first interface, a data transmission apparatus, an audio output apparatus and a processing apparatus.

The fixing apparatus is adapted to, in a case that a user wears the electronic device, maintain a position relationship between the electronic device and at least part of body of the user.

The first interface is adapted to detachably connect the second interface of the image capturing apparatus.

The data transmission apparatus is adapted to, in a case that a data connection is established between the electronic device and a second electronic device, perform data transmission with the second electronic device.

The audio output apparatus having an audio output area is adapted to output sound to the audio output area.

The processing apparatus is adapted to control at least one of the data transmission apparatus, the audio output apparatus and the image capturing apparatus connected to the first interface.

The electronic device includes no image displaying apparatus.

A possible practical implementation of the electronic device may be as shown in FIG. 12.

The image capturing apparatus according to the embodiment of the disclosure may be installed on a wearable electronic device including the audio output apparatus. Therefore, the portability is enhanced and it is more convenient to perform image capturing.

The embodiments of the disclosure are described progressively. Differences between the embodiments of the disclosure are highlighted while the same or similar parts between the embodiments of the disclosure may be referred to each other.

It should further be noted that, terms of "first", "second", etc., used in the specification are intended to distinguish an entity or operation from another entity or operation, rather than to require or hint that a real relationship or order exists between the entities or operations. In addition, terms of "include", "comprise" and any transformation thereof are intended to be non-exclusive; procedures, methods, items or apparatus including a series of elements are not limited to the elements, and inherent elements or elements which are not clearly listed may further be included in the procedures, methods, items or apparatus. Without more limitations, if an element is restricted with an expression of "include(s) a . . . ", the procedures, methods, items or apparatus including the element may include other similar elements.

With the description of the above embodiments of the disclosure, the disclosure may be implemented or used by those skilled in the art. Various modifications to those embodiments of the disclosure are apparent for those skilled in the art. The general principle defined in the specification may be implemented with other embodiments without departing from the spirit or scope of the disclosure. Therefore, the disclosure is not limited to the illustrated embodiments in the specification, and the disclosure is intended to protect a widest scope consistent with the principle and features disclosed in the specification.

The invention claimed is:

1. An electronic device comprising:
a fixing structure adapted to, in a case that a user wears the electronic device, maintain a position relationship between the electronic device and at least part of a body of the user;
an image capturing apparatus having an image capturing area, adapted to capture an image in the image capturing area;
a data transmission apparatus adapted to, in a case that a data connection is established between the electronic device and a second electronic device, perform data transmission with the second electronic device;
an audio output apparatus having an audio output area, adapted to output sound to the audio output area; and
a processor adapted to control at least one of the image capturing apparatus, the data transmission apparatus, and the audio output apparatus,
wherein:
the electronic device comprises no image displaying apparatus,
the image capturing apparatus comprises a camera,
the camera has at least a first position and a second position with respect to the electronic device, and
the processor is adapted to, in response to detecting that the camera is switched to the first position, turn on the camera to cause the camera to operate in a capturing state for capturing the image in the image capturing area, and in response to detecting that the camera is switched to the second position, turn off the camera to cause the camera to stop operating.

2. The electronic device according to claim 1, wherein:
the image capturing apparatus further comprises a support connected to the camera for supporting the camera, and
a position of the camera with respect to the electronic device is switched between the first position and the second position, in response to the support being switched between two positions with respect to the electronic device.

3. The electronic device according to claim 2, further comprising:
a first detection apparatus, adapted to detect the position of the camera,
wherein the processor is adapted to, in response to detecting by the first detection apparatus that the camera is switched to the first position, turn on the camera to operate in the capturing state for capturing the image in the image capturing area.

4. The electronic device according to claim 1, further comprising a case, wherein the fixing structure is a part of the case or the fixing structure is connected with the case, and the processor is arranged in the case.

5. The electronic device according to claim 2, further comprising a case, wherein the fixing structure is a part of the case or the fixing structure is connected with the case, and the processor is arranged in the case.

6. The electronic device according to claim 4, wherein:
the fixing structure has a preset shape, and
when the user wears the electronic device, the fixing structure having the preset shape is adapted to maintain a position relationship between the electronic device and at least part of head of the user.

7. The electronic device according to claim 6, further comprising a rotatable supporter, wherein:
a first end of the rotatable supporter is connected with the case,
a second end of the rotatable supporter is connected with the camera,
the first end and the second end are opposite to each other, and
the rotatable supporter is capable of rotating with the first end as a base, to switch the position of the camera with respect to the electronic device between the first position and the second position.

8. The electronic device according to claim 6, further comprising a retractable supporter, wherein:
a first end of the retractable supporter is connected with the case,
a second end of the retractable supporter is connected with the camera,
the first end and the second end are opposite to each other, and
the retractable supporter is capable of shrinking and extending, to switch the position of the camera with respect to the electronic device between the first position and the second position based on different amplitudes of the shrinking and extending of the retractable supporter.

9. The electronic device according to claim 6, wherein:
the fixing structure having the preset shape comprises a hanging unit,
the hanging unit has a hanging structure of a first preset shape,
the electronic device is capable of being fixed on an auricle of the user by the hanging structure, and
a position relationship between the hanging unit and the audio output apparatus is set in such a manner that an external auditory canal of the user is in the audio output area of the audio output apparatus to make the user sense sound output from the audio output apparatus.

10. The electronic device according to claim 6, wherein:
the fixing structure having the preset shape comprises a bulge unit,
the bulge unit has a bulge structure of a second preset shape,
the audio output apparatus is arranged in the bulge structure, and
the bulge structure is capable of being inserted into an external auditory canal of the user to make the user sense sound output from the audio output apparatus.

11. The electronic device according to claim 1, wherein, in a case that the user wears the electronic device and the camera is in the first position:
a position relationship between the fixing structure and the camera is set in such a manner that a capturing direction of the camera is consistent with a direction of a visual field of the user, and
the image capturing area comprises the visual field of the user.

12. The electronic device according to claim 3, wherein in a case that the user wears the electronic device and the camera is in the first position:
a position relationship between the fixing structure and the camera is set in such a manner that a capturing direction of the camera is consistent with a direction of a visual field of the user, and the image capturing area comprises the visual field of the user.

13. The electronic device according to claim 11, wherein in a case that the user wears the electronic device and the camera is in the first position, a position relationship between the fixing structure and the camera is set in such a manner that the image capturing area (i) does not comprise a part of the body where the user wears the fixing structure and (ii) does not comprise a part within a preset range from the part of the body where the user wears the fixing structure.

14. The electronic device according to claim 1, wherein the processor is adapted to:

control the image capturing apparatus, and to crop an image captured in the image capturing area by the image capturing apparatus to obtain an image at least corresponding to a visual field of the user.

15. The electronic device according to claim 14, wherein the processor is adapted to crop, based on a position relationship between the image capturing apparatus and at least one eye of the user, the image captured in the image capturing area by the image capturing apparatus to obtain an image at least corresponding to the visual field of the user.

16. The electronic device according to claim 1, wherein:

the electronic device further comprises a first interface, the image capturing apparatus is detachably connected to the first interface, and the processor is adapted to control the image capturing apparatus via the first interface.

17. The electronic device according to claim 1, wherein:

the processor is adapted to control the image capturing apparatus, the electronic device further comprises an audio input apparatus adapted to capture an audio signal, and the processor is adapted to, if it is identified that the audio signal captured by the audio input apparatus satisfies a preset condition, trigger the image capturing apparatus to operate in the capturing state for capturing the image in the image capturing area.

18. The electronic device according to claim 1, wherein the processor is adapted to control the data transmission apparatus to perform audio data and/or image data transmission with the second electronic device.

19. An electronic device comprising:

a fixing structure adapted to, in a case that a user wears the electronic device, maintain a position relationship between the electronic device and at least part of body of the user;

a first interface adapted to detachably connect to an image capturing apparatus, wherein the image capturing apparatus has an image capturing area and is adapted to capture an image in the image capturing area;

a data transmission apparatus adapted to, in a case that a data connection is established between the electronic device and a second electronic device, perform data transmission with the second electronic device;

an audio output apparatus having an audio output area, adapted to output sound to the audio output area; and a processor adapted to control at least one of the data transmission apparatus, the audio output apparatus and the image capturing apparatus connected to the first interface, wherein:

the electronic device comprises no image displaying apparatus, the image capturing apparatus comprises a camera, the camera has at least a first position and a second position with respect to the electronic device, and the processor is adapted to, in response to detecting that the camera is switched to the first position, turn on the camera to operate in a capturing state for capturing the image in the image capturing area, and in response to detecting that the camera is switched to the second position turn off the camera to cause the camera to stop operating.

20. An image capturing apparatus comprising:

an image capturing apparatus having an image capturing area, adapted to capture an image in the image capturing area; and a second interface connected to the image capturing apparatus, adapted to connect an electronic device, wherein the electronic device comprises:

a fixing structure adapted to, in a case that a user wears the electronic device, maintain a position relationship between the electronic device and at least part of body of the user;

a first interface adapted to detachably connect the second interface of the image capturing apparatus;

a data transmission apparatus adapted to, in a case that a data connection is established between the electronic device and a second electronic device, perform data transmission with the second electronic device;

an audio output apparatus having an audio output area, adapted to output sound to the audio output area; and a processor adapted to control at least one of the data transmission apparatus, the audio output apparatus and the image capturing apparatus connected to the first interface, and wherein:

the electronic device comprises no image displaying apparatus, the image capturing apparatus comprises a camera, the camera has at least a first position and a second position with respect to the electronic device, and the processor is adapted to, in response to detecting that the camera is switched to the first position, turn on the camera to cause the camera to operate in a capturing state for capturing the image in the image capturing area, and in response to detecting that the camera is switched to the second position, turn off the camera to cause the camera to stop operating.

* * * * *